United States Patent [19]
Hallett

[11] Patent Number: 5,873,589
[45] Date of Patent: Feb. 23, 1999

[54] HAND-DRIVEN BICYCLE/WHEELCHAIR COMBINATION

[76] Inventor: Robert L. Hallett, 15 Park Rd., Villa Grove, Ill. 61956

[21] Appl. No.: 617,577

[22] Filed: Mar. 19, 1996

[51] Int. Cl.$^6$ ..................................................... B62M 1/00
[52] U.S. Cl. ................................... 280/250.1; 280/304.1; 224/412
[58] Field of Search ................................. 280/250.1, 282, 280/304.1, 30, 7.1, 7.15; 224/412, 419, 441, 452, 454, 488, 494, 524, 545, 413, 407, 418, 425, 446, 453, 547, 564, 567, 924; 211/17

[56] References Cited

U.S. PATENT DOCUMENTS

| | | | |
|---|---|---|---|
| 3,901,527 | 8/1975 | Danziger et al. | 280/250.1 |
| 4,109,927 | 8/1978 | Harper | 280/250 |
| 4,176,771 | 12/1979 | Dubroc | 224/412 |
| 4,316,616 | 2/1982 | Boivin | 280/289 WC |
| 4,371,183 | 2/1983 | Dion | 280/250.1 |
| 4,403,716 | 9/1983 | Carlson et al. | 224/924 |
| 4,471,972 | 9/1984 | Young | 280/289 WC |
| 4,483,548 | 11/1984 | Zirrilo | 280/289 WC |
| 4,720,117 | 1/1988 | Hay | 280/250 |
| 4,767,130 | 8/1988 | Fu-Chao | 280/250.1 |
| 5,022,671 | 6/1991 | Jones, Jr. | 280/250 |
| 5,354,084 | 10/1994 | Lofgren et al. | 280/250 |
| 5,507,513 | 4/1996 | Peters et al. | 280/304.1 |
| 5,573,260 | 11/1996 | Peterson et al. | 280/250.1 |

FOREIGN PATENT DOCUMENTS

| | | | |
|---|---|---|---|
| 529233 | 5/1957 | Belgium | 280/250.1 |
| 1298013 | 6/1969 | Germany | 280/282 |
| 2205284 | 12/1988 | United Kingdom | 280/304.1 |

*Primary Examiner*—Mark T. Le
*Attorney, Agent, or Firm*—Wood, Phillips, VanSanten, Clark & Mortimer

[57] ABSTRACT

A commuting system providing primary and secondary devices for commuting for a wheelchair-confined operator is provided in the form of a hand-powered and controlled tricycle and a rack mounted on the tricycle, the rack being adapted to carry a wheelchair during operation of the tricycle. The tricycle is provided with a footrest that retains the legs of a paraplegic operator by tipping the feet of the operator to angle the legs inwardly and force the knees of the operator together. The tricycle further includes a suspension system to provide an operator with a relatively comfortable ride over typical sidewalk and roadway surfaces.

13 Claims, 2 Drawing Sheets

HAND-DRIVEN BICYCLE/WHEELCHAIR COMBINATION

FIELD OF THE INVENTION

This invention relates to commuting systems for wheelchair confined operators and, more particularly, to hand-driven commuting systems, such as hand-driven wheelchairs, tricycles and bicycles.

BACKGROUND OF THE INVENTION

The use of a hand-driven bicycle or tricycle for commuting systems for wheelchair-confined operators is known. Specifically, a hand-driven crank, similar to the foot-driven crank employed in a standard bicycle, is mounted forward of the seat in a position such that the operator may operate the crank by hand. The hand crank may be integral with or separate from the steering mechanism for the tricycle. Examples of such systems are shown in U.S. Pat. Nos. 4,109,927 to Harper, 5,022,671 to Jones, and 5,354,084 to Lofgren et al.

It is also known to mount a hand-crank-driven front wheel and steering assembly to the front of a conventional wheelchair to temporarily form a hand-driven tricycle system. Examples of such systems are shown in U.S. Pat. Nos. 4,316,616 to Boivin, 4,483,548 to Zirrilo, 4,720,117 to Hay, and 4,471,972 to Young.

While conventional hand-driven tricycles are acceptable for transporting a wheelchair-confined operator to and from destinations that are separated by a distance that is too great to be quickly or easily commuted by a conventional wheelchair, conventional hand-driven tricycles suffer a number of shortcomings.

For example, while conventional hand-driven tricycles are acceptable for outdoor use on sidewalks and roadways, they are typically too large and cumbersome to be easily operated in the interior of an office, restaurant, store, or other common destinations having access limited by relatively small pathways. Another shortcoming of some conventional hand-driven tricycles, is the failure to provide a comfortable ride for the operator when the tricycle is operated over typical sidewalk and roadway surfaces. Yet another shortcoming associated with some conventional hand-driven tricycles is that they require the legs of paraplegic operators to be bound to the tricycle to prevent the legs from being jostled from their correct position during operation of the hand-driven tricycle. An additional shortcoming associated with conventional hand-driven tricycles is that the wheels may become soiled during an outdoor commute to a point where they are unsuitable for indoor use. These shortcomings decrease the convenience of using such hand-driven tricycles and, accordingly, may discourage wheelchair-confined operators from using such hand-driven tricycles to increase their mobility.

The present invention is directed, at least in part, toward overcoming one or more of the problems discussed above.

SUMMARY OF THE INVENTION

In accordance with the present invention, a commuting system providing primary and secondary means for commuting for a wheelchair-confined operator is provided in the form of a hand powered and controlled tricycle and a rack mounted on the tricycle and adapted to carry a wheelchair during operation of the tricycle.

In another aspect of the invention, the rack includes a wheel-receiving member having a curved shape that conforms at least partially to an outer circumference of a wheel on a wheelchair to be carried in the rack.

In yet another aspect of the invention, the rack is detachably connected to the tricycle.

In another aspect of the invention, the tricycle includes a frame having a front end and a back end, two oppositely-spaced transverse axles mounted on the frame adjacent the back end of the frame, two oppositely-spaced rear wheels rotatably mounted on the axles, a seat supported on the frame between the rear wheels, and a seat back on the frame extending upwardly from the seat. The seat defines an upwardly-facing plane and the seat back defines a forwardly-facing plane. The rear wheels are located on the frame with less than 1/10 of an outermost circumference of each of the rear wheels extending between the upwardly-facing plane and the forwardly-facing plane thereby allowing an operator relatively unrestricted access to and from the operator position.

In yet another aspect of the invention, a wheelchair is carried in the rack and has a seat that is located a predetermined vertical height from the ground when the wheelchair is in use. The seat on the tricycle is located on the frame at a vertical height from the ground that is approximately equal to the predetermined vertical height of the seat on the wheelchair carried in the rack.

In another aspect of the invention, the tricycle further includes a foot lock for retaining the feet and legs of an operator. The foot lock includes a foot rest having two oppositely-spaced sides, a platform, and a pair of longitudinally-extending rods, with each rod mounted adjacent to one of the oppositely-spaced sides at a predetermined height above the platform to support an outer edge of a foot of an operator at a height greater than an inner edge of the foot resting on the platform, thereby tipping the feet of an operator so that the lower legs of an operator are angled inwardly to force the knees of an operator against each other.

In yet another aspect of the invention, the tricycle further includes a suspension system. The suspension system includes a main sub-frame, a seat sub-frame, and a spring. The main sub-frame supports the front wheel of the tricycle. The seat sub-frame supports the rear wheels of the tricycle and has a first end pivotably connected to the main sub-frame, and a second end spaced from the first end. The spring is mounted between the main sub-frame and a second end of the seat sub-frame and supports the second end relative to the main sub-frame.

It is an object of the invention to increase the mobility and self-sufficiency of wheelchair-confined operators by increasing the convenience of using hand-driven tricycles to commute between destinations.

It is a further object of the present invention to provide a commuting system for wheelchair-confined operators that will provide such operators with an efficient means of commuting over relatively large distances between destinations and an efficient means for commuting within the locality of a particular destination.

It is another object of the present invention to provide a hand-driven tricycle which may be conveniently mounted and dismounted by a wheelchair-confined operator and, further, that does not require the legs of a paraplegic operator to be bound to the tricycle.

Still another object of the present invention is to provide a hand-driven tricycle that provides a comfortable ride for the operator when the tricycle is operated over typical sidewalk and roadway surfaces.

A further object of the present invention is to provide a commuting system for wheelchair-confined operators that provides a wheelchair having relatively clean wheels for indoor use after an outdoor commute in conditions that soil the wheels of the device used for the outdoor commute to a point where they are unsuitable for indoor use.

Numerous other advantages and features of the present invention will become readily apparent from the following detailed description of the invention, the accompany Figures, and the appended claims.

DETAILED DESCRIPTION OF THE PREFERRED EMBODIMENT

Although this invention is susceptible to embodiment in many different forms, a preferred embodiment of the invention is shown. It should be understood, however, that the present disclosure is to be considered as an exemplification of the principles of this invention and is not intended to limit the invention to the embodiment illustrated.

Figure 1:
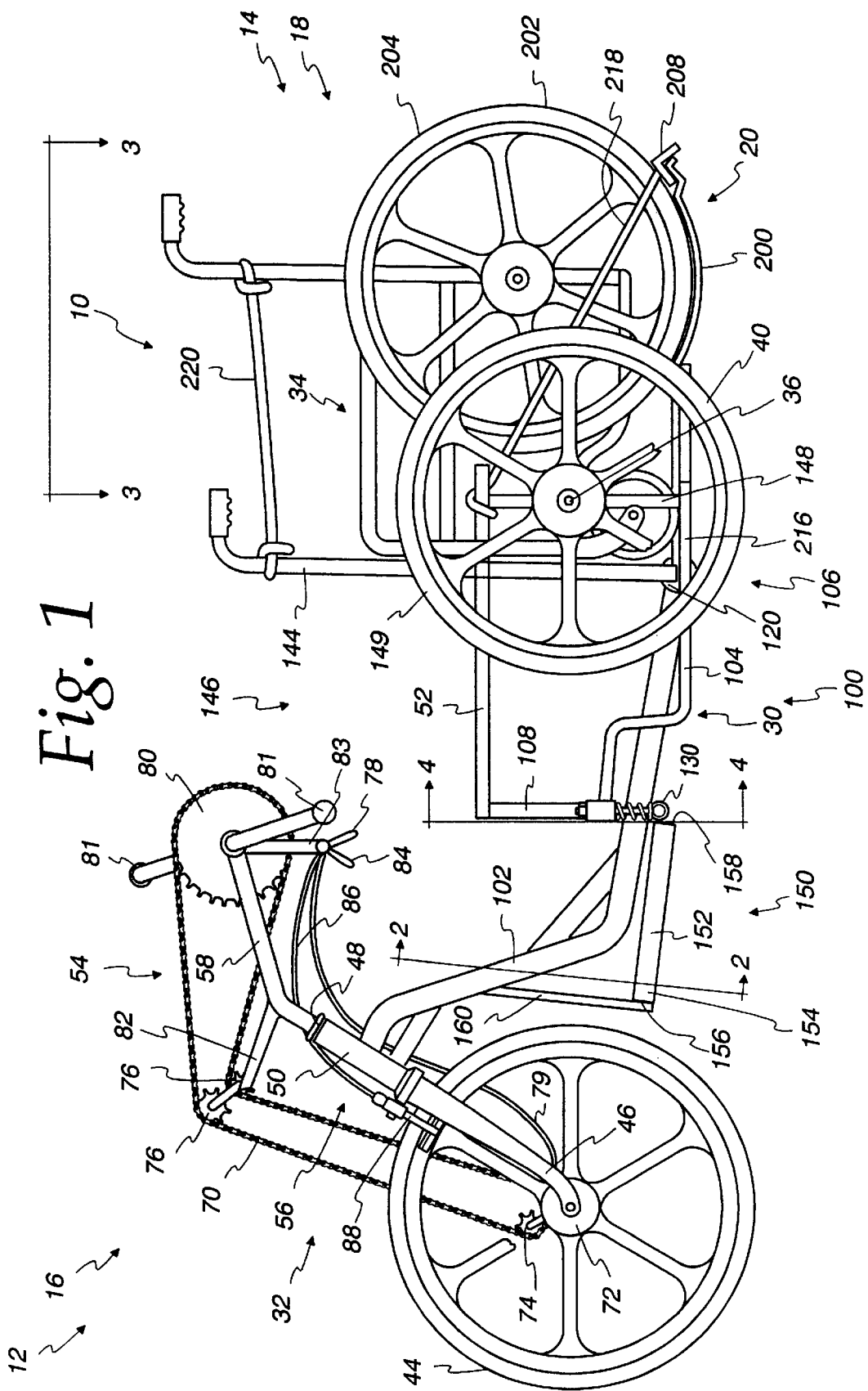
FIG. 1 is a side view of a commuting system embodying the present invention.

FIG. 1 illustrates the preferred embodiment of the present commuting system 10 for a wheelchair-confined operator that provides primary means for commuting 12 and secondary means for commuting 14. The primary means for commuting 12 is provided in the form of a tricycle 16. The secondary means for commuting 14 is provided in the form of a conventional wheelchair 18 that is carried in a rack 20 that is mounted on the tricycle 16.

Figure 4:
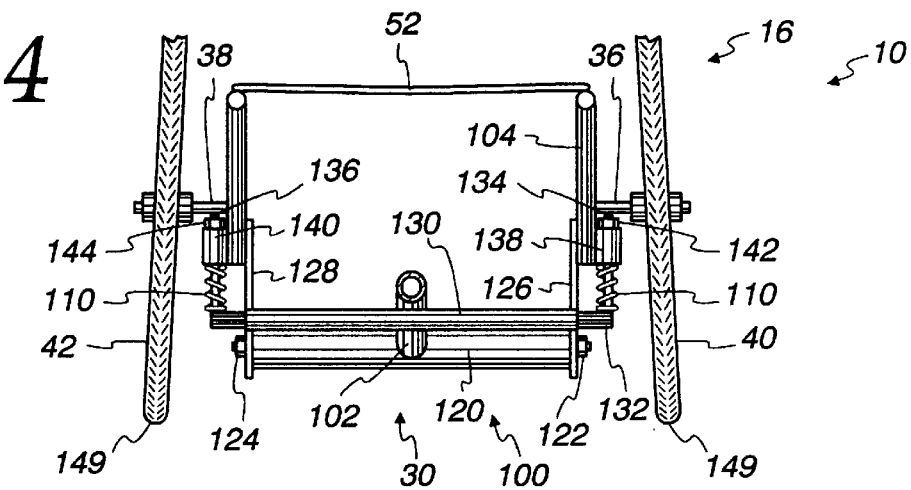
FIG. 4 is a view of the commuting system shown in FIG. 1 taken along line 4—4 and illustrates the suspension system of the commuting system shown in FIG. 1.

As best seen in FIG. 1, the tricycle 16 includes a frame 30 having a front end 32 and a back end 34. As best seen in FIGS. 1 and 4, left and right transverse axles 36 and 38, respectively, are spaced oppositely from each other and mounted on the frame 30 adjacent the back end 34 (right transverse axle 38 is hidden in FIG. 1). A left rear wheel 40 is rotatably mounted on the left axle 36 and a right rear wheel 42 is rotatably mounted on the right axle 38 (right rear wheel 42 is hidden in FIG. 1). As seen in FIG. 1, a front wheel 44 is mounted to a conventional bicycle fork 46 adjacent the front end 32 of the frame 30. The fork 46 is mounted by a conventional head set 48 which, in turn, is mounted in a head tube 50 of the frame 30. A seat 52 is mounted to the frame 30 forward of the left and right axles 36 and 38 and behind the front wheel 44.

As seen in FIG. 1, the front wheel 44 functions as the drive wheel for the tricycle 16. In this regard, a hand-driven drive train 54 is mounted on a fork/stem assembly 56 consisting of the fork 46 and a stem 58. The drive train 54 consists of conventional bicycle drive train components and includes a chain 70, a free wheel 72 mounted on the front wheel 44, a rear derailleur 74 mounted on the fork 46, idler sprockets 76, a shift lever 78, a cable 79 and a crank set 80. The crank set 80 is rotatably mounted on the stem 58 and has been modified with hand grips 81 in place of conventional foot pedals, as is known in the art. The chain 70 operably engages the sprockets of the crank set 80 with the sprockets of the free wheel 72. The idler sprockets 76 are mounted on a bracket 82 extending from the stem 58. The idler sprockets 76 guide the chain 70 as it travels between the sprockets of the crank set 80 and the free wheel 72. The shift lever 78 is mounted to a bracket 83 extending from the stem 58 and operates the rear derailleur 74 through the cable 79 to shift the chain 70 between the various sprockets of the free wheel 72. Shifting of the chain 70 between the sprockets of the crank set 80 is accomplished by manually lifting the chain 70 from one sprocket to the other.

It will be appreciated by those skilled in the art that the specific details of the drive train 54 provided above are not critical and could easily be substituted with any of the hand-driven drive trains that are known in the art.

A second conventional shift lever 84 and conventional cable 86 operate a conventional cantilever brake 88 mounted to the fork 46 to engage the front wheel 44.

As best seen in FIGS. 1 and 4, the frame 30 has a suspension system 100 including a main sub-frame 102 extending between the front end 32 and the back end 34, a seat sub-frame 104 having a first end 106 pivotably connected to the main sub-frame 102 adjacent the back end 34 and a second end 108 located forward of the first end 106, and springs 110 mounted between the main sub-frame 102 and the second end 108 of the seat sub-frame 104 to support the second end 108 relative to the main sub-frame 102. As best seen in FIG. 4, the main sub-frame 102 includes a transverse tube 120 having oppositely-spaced pivot connections 122 and 124 that pivotably connect the main sub-frame 102 to respective down brackets 126 and 128 of the seat sub-frame 104. The main sub-frame 102 further includes a second transverse tube 130 that pivotably mounts a pivot bar 132 to the main sub-frame 102. Guide posts 134 and 136 are fixed to and extend from either end of the pivot bar 132. The guide posts 134 and 136 extend into respective journal bores 138 and 140 fixed to the seat sub-frame 104. The springs 110 are mounted on the guide posts 134 and 136 between the pivot bar 132 and the journal bores 138 and 140. Respective retainer nuts 142 and 144 are threaded onto the ends of the guide posts 134 and 136 to retain the guide posts 134 and 136 in engagement with the journal bores 138 and 140.

As best seen in FIG. 1, the seat sub-frame 104 mounts and supports the seat 52 and includes a seat back 144 extending upwardly from the seat 52. The seat 52 defines an upwardly-facing plane and the seat back 144 defines a forwardly-facing plane. Together, the seat 52 and the seat back 144 define a forwardly-facing operator position 146 between the upwardly-facing plane and the forwardly-facing plane. The seat sub-frame 104 further includes left and right axle support tubes 148 that mount the left and right axles 36 and 38, so that the rear wheels 40 and 42 are located relative to the frame with less than ¹⁄₁₀ of their outermost circumference 149 extending between the upwardly-facing plane and the forwardly-facing plane, thereby allowing an operator relatively unrestricted access to and from the operator position 146.

Additionally, the seat sub-frame 104 locates the seat 52 on the frame 30 at a vertical height from the ground that is approximately equal to that of the seat of the wheelchair 18 when the wheelchair 18 is deployed from the rack 20.

In the illustrated embodiment, the seat sub-frame 104 is simply a conventional wheelchair frame that has been modified. More specifically, as best seen in FIG. 1, the conventional frame has been modified with the support tubes 148 to place the left and right axles 36 and 38 and left and right wheels 40 and 42 approximately 5" back from the conventional position. Additionally, the down brackets 126 and 128 have been added to the conventional frame. Finally, it should be noted that the journal bores 138 and 140 are simply the bores on the conventional wheelchair frame that received the vertical pivot axes for the front caster wheels of the conventional wheelchair.

Figure 2:
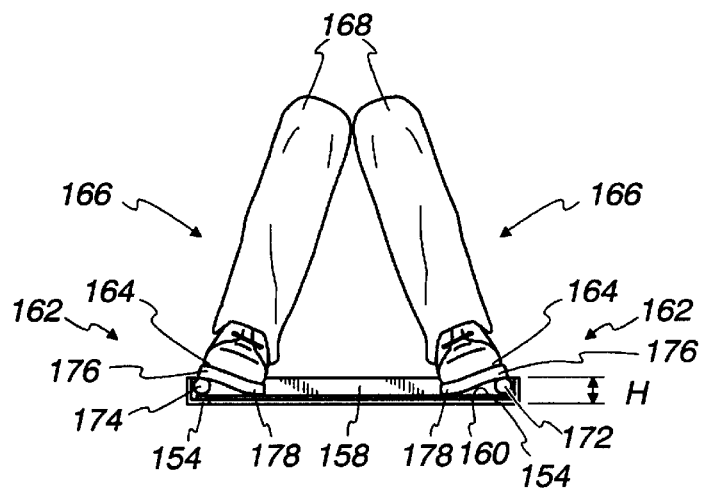
FIG. 2 is a section view of the commuting system shown in FIG. 1 taken along line 2—2 and shows the legs of an operator positioned on the commuting system shown in FIG. 1.

As best seen in FIG. 1, a foot rest 150 is provided on the main sub-frame 102 immediately forward of the second transverse tube 130. The foot rest 150 has an open, rectangular frame 152 with two sides defined by two pieces of angle iron 154, a front defined by a piece of angle iron 156, and a back defined by a piece of angle iron 158, with all four pieces of angle iron 154, 154, 156, and 158 welded together at their ends. As best seen in FIG. 2, a platform 160 is provided inside the rectangular frame 152 in the form of a rectangular piece of gated steel mesh 160 welded to the frame 152. As seen in FIG. 1, the back angle iron 154 of the rectangular frame 152 is welded to the second transverse tube 130 and the front angle iron 154 of the rectangular frame 152 is welded to a support bracket 160 that, in turn, is either welded or brazed to the main sub-frame 102. As seen in FIG. 2, the foot rest 150 further includes means 162 for tipping the feet 164 of an operator so that the lower legs 166 of an operator are angled inwardly to force the knees 168 of an operator against each other. The tipping means 162 is shown in the form of a pair of longitudinally-extending rods 172 and 174 welded to the angle irons 154 on opposite sides of the rectangular frame 152. Each rod 172 and 174 is mounted to the rectangular frame 152 about the platform 160 to support an outer edge 176 of a foot 164 of an operator at a height greater than an inner edge 178 of the foot 164 resting on the platform 160. In the preferred embodiment, the height H is approximately one-half of an inch.

Though not shown, a stop can also be provided on the platform 160 inwardly of the rods 172,174 to help ensure that, during operation, the feet 164 maintain proper orientation with their outer edges 176 on the respective rods 172,174.

Figure 3:
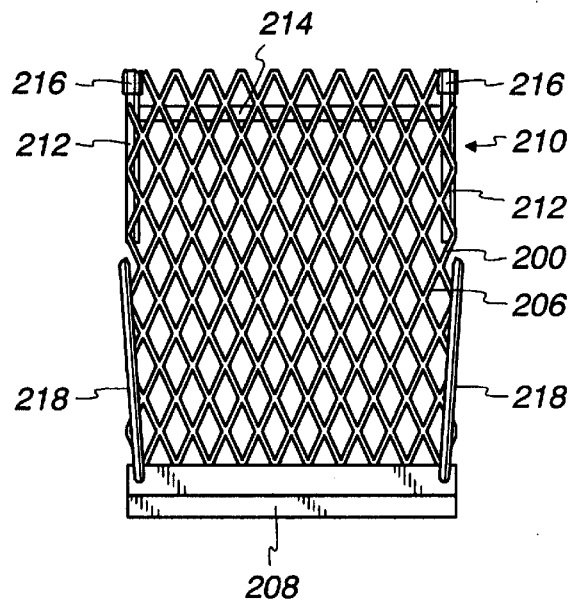
FIG. 3 is a view of the commuting system shown in FIG. 1 taken from line 3—3 with the wheelchair removed.

As best seen in FIG. 1, the wheelchair rack 20 includes a wheel-receiving member 200 having a curved shape that conforms, at least partially, to the outer circumference 202 of a rear wheel 204 of the wheelchair 18. As best seen in FIG. 3, the wheel-receiving member 200 is formed from a flexible gated metal mesh 206, one end of which is attached to and supported by stiffener bar 208. The rack 20 further includes an H frame 210 formed from two oppositely-spaced, longitudinally-extending tubes 212 and a cross bar 214. The H frame 210 supports the other end of the wheel-receiving member 200 and detachably connects the rack 20 to the frame 30 of the tricycle 16 by sliding into hollow tube members 216 of the seat sub-frame 104. As best seen in FIG. 1, the rack 20 also includes support cables 218 (shown only partially in FIG. 3) that are attached to either end of the stiffener bar 208 and detachably connected, i.e., tied, to the seat sub-frame 104.

The operation of the commuting system 10 can best be understood with reference to FIG. 1. To operate the commuting system 10, a wheelchair-confined operator will approach the tricycle 16 in the wheelchair 18. The operator will position the wheelchair 18 adjacent the operator position 146 and will transfer from the wheelchair 18 to the operator position 146. At this point, it should be noted that the operator's access to the operator position 146 is enhanced by the positioning of the axles 36 and 38 rearward of the seat back 144 to minimize interference between the rear wheels 40 and 42 and the operator as the operator moves into and out of the operator position 146.

After transferring to the operator position 146, the operator, facing sideways on the seat 52, collapses the wheelchair 18 and maneuvers the wheelchair 18 into the rack 20 so that the collapsed wheelchair 18 is positioned between the support cables 218, with its wheels resting on the wheel-receiving member 200. It should be appreciated that the wheel-conforming shape of the wheel-receiving member 200 acts to retain the wheelchair 18 in the rack 20 once the wheelchair 18 is positioned in the rack 20. Additionally, the stiffener bar 208 abuts the rear wheels 204 of the wheelchair 18, thereby providing further retention of the wheelchair 18 within the rack 20. Further, the operator may optionally secure the wheelchair to the tricycle 16 with any suitable means for securing, such as with a bunge cord 220 attached to the wheel chair 18 and the seat back 144, as shown in FIG. 1.

As best seen in FIG. 2, after the wheelchair 18 is stowed in the wheelchair rack 20, the operator places his feet 164 in the foot rest 150 with the outer edges 176 of his feet 164 resting on the rods 172 and 174 and the inner edges 178 of his feet 164 resting on the platform 160, thereby angling the lower legs 166 of the operator inwardly to force the knees 168 of the operator against each other. As best seen in FIG. 1, the gooseneck shape of the main sub-frame 102 as it extends from the head tube 50 past the foot rest 150 allows the operator's legs to be positioned in the foot rest 150 with a minimum amount of interference with the main sub-frame 102.

Once the operator is appropriately positioned in the operator position 146, the operator powers the tricycle 16 by grasping the hand grips 81 and rotating the crankshaft 80. The operator steers the tricycle 16 with the hand grips 82, pivoting the front wheel 44 through the fork/stem assembly 56. The operator may utilize the shift lever 78 to select a gear ratio for the drive train 54 that is most comfortable for the operator at a given speed.

Upon arriving at a desired destination, the operator may stop the tricycle by activating the brake 88 with the shift lever 84. The operator will then turn sideways on the seat 52 and remove the wheelchair 18 from the rack 20. Next the operator will position the wheelchair 18 adjacent the operating position 146 and expand the wheelchair 18 into its usable state. Finally, the operator will transfer from the operator position 146 into the seat of the wheelchair 18.

During operation of the tricycle 16, the suspension system 100 will operate to absorb impacts from various roadway and sidewalk obstacles as they are encountered by the wheels 40, 42 and 44 of the tricycle 16. For example, when the left and right rear wheels 40 and 42 are forced upwards by an impact force, the weight of the operator on the seat 52 will resist the upward movement of the seat sub-frame 104, thereby forcing the seat sub-frame 104 to pivot about the axles 36 and 38, the pivot connections 122 and 124, and the transverse tube 130 and compress the springs 110 until a force equilibrium is achieved. Accordingly, something less than the full magnitude of the upward movement of the wheels 40 and 42 is transferred to the operator, thereby providing the operator with a relatively comfortable ride when the tricycle is operated over typical sidewalk and roadway surfaces.

One advantage of the commuting system 10 is that it allows a wheelchair-confined operator to efficiently commute between locations that are separated by a relatively large distance and, upon arrival at a location having access limited by relatively small pathways, to move about that location in a wheelchair that has been optimized for that specific purpose.

Another advantage of the commuting system 10 is that it provides a wheelchair-confined operator with a wheelchair having relatively clean wheels for indoor use after an outdoor commute in conditions that soil the wheels of the device used for the outdoor commute to a point where they are unsuitable for indoor use.

Another advantage of the commuting system 10 is that it allows the legs of a wheelchair-confined operator to be conveniently retained in a safe position on the tricycle 16 without the inconvenience of binding the operator's legs to themselves or to the tricycle. This facilitates a wheelchair-confined operator's access to the tricycle 16.

Yet another advantage of the commuting system 10 is that it facilitates the transfer of the operator between the tricycle 16 and the wheelchair 18 by placing the seat 52 of the tricycle 16 and the seat of the wheelchair 18 at approximately the same height and by locating the rear wheels 40 and 42 of the tricycle so that they do not interfere with the operator's access to the tricycle 16.

A further advantage of the commuting system 10 is that the rack 20 is detachable, thereby allowing an operator to utilize the tricycle 16 without the additional weight of the rack 20 when an operator does not desire to use the wheelchair 18.

All of the above-listed advantages increase the convenience of using a hand-driven tricycle for a wheelchair-confined operator, thereby encouraging the use of hand-driven tricycles by wheelchair confined operators and increasing the mobility and self-sufficiency of wheelchair-confined operators.

This invention has been described in terms of specific embodiments set forth in detail, but it should be understood that these are by way of illustration only and that the invention is not necessarily limited thereto. For example, the wheelchair rack 20 may be adapted for use with any form of hand-operated tricycle and any form of wheelchair and, accordingly, is not limited to use with the illustrated hand-operated tricycle 16 and conventional wheelchair 18. Similarly, while in the illustrated embodiments it is preferred to locate the wheelchair rack 20 so that it carries a wheelchair 18 behind the seat 52 and between the rear wheels 40 and 42, a different location may be appropriate for other combinations of hand-operated tricycles and wheelchairs. Other modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

I claim:

1. A commuting system for a wheelchair confined operator, said commuting system comprising:
    a hand powered and controlled tricycle; and
    a rack mounted on the tricycle, said rack adapted to carry a wheelchair during operation of the tricycle.

2. The commuting system of claim 1 further comprising securing means for securing a wheelchair to at least one of the rack and the tricycle.

3. The commuting system of claim 1 further comprising a wheelchair carried in said rack for deployment as an alternate means for commuting.

4. The commuting system of claim 1 wherein said tricycle further comprises:
    a front wheel;
    a rear wheel; and
    a suspension system including:
        a main sub-frame supporting said front wheel,
        a seat sub-frame supporting said rear wheel and having a first end pivotably connected to said main sub-frame, and a second end spaced from said first end, and
        a spring mounted between said main sub-frame and said second end, said spring supporting said second end relative to said main sub-frame.

5. The commuting system of claim 1 further comprising means for detachably connecting said rack to said tricycle.

6. The commuting system of claim 1 wherein said rack includes a transverse bar that is mounted to abut a wheel on a wheelchair to be carried in said rack.

7. The commuting system of claim 1 wherein:
    said tricycle includes a frame having a front end and a back end, two oppositely spaced transverse axles mounted on said frame adjacent said back end of said frame, two oppositely spaced rear wheels rotatably mounted on said axles, and a seat supported on said frame between said rear wheels; and
    said rack extends from said back end of said frame, and is located between said wheels and behind said seat.

8. The commuting system of claim 7 wherein:
    said tricycle further includes a seat back on said frame extending upwardly from said seat, said seat defining an upwardly-facing plane and said seat back defining a forwardly-facing plane; and
    said rear wheels are located on the frame with less than one tenth of an outer-most circumference of each of the rear wheels extending between the upwardly-facing plane and the forwardly-facing plane.

9. The commuting system of claim 1 wherein said tricycle includes a frame and a seat located on said frame at a vertical height from the ground that is approximately equal to that of a seat on a wheelchair to be carried in the rack, thereby allowing an operator to move relatively easily between said tricycle and said wheelchair when said wheelchair is deployed from said rack for use as an alternate means of commuting.

10. The commuting system of claim 1 further comprising:
    a wheelchair carried in said rack and having a wheelchair seat that is located at a predetermined vertical height from the ground when said wheelchair is in use; and wherein
    said tricycle includes a frame and a seat located on said frame at a vertical height from the ground that is approximately equal to said predetermined vertical height.

11. The commuting system of claim 1 wherein said tricycle further includes a foot rest for retaining the feet and legs of an operator, said foot rest including means for tipping the feet of an operator so that the lower legs of an operator are angled inwardly to force the knees of an operator against each other.

12. The commuting system of claim 11 wherein:
    said foot rest includes a frame having two oppositely spaced sides and a platform supported by said frame; and
    said tipping means includes a pair of longitudinally extending rods, each rod mounted adjacent one of said oppositely spaced sides above the platform to support an outer edge of a foot of an operator at a height greater than an inner edge of the foot resting on said platform.

13. A commuting system for a wheelchair confined operator, said commuting system comprising:

a hand powered and controlled tricycle; and a rack mounted on the tricycle, said rack adapted to carry a wheelchair during operation of the tricycle and including a wheel receiving member, said wheel receiving member having a curved shape that conforms at least partially to an outer circumference of a wheel on a wheelchair to be carried in said rack.

* * * * *